(12) United States Patent
Thurston et al.

(10) Patent No.: US 6,615,874 B2
(45) Date of Patent: Sep. 9, 2003

(54) STACKED DISK VALVE TRIM (75) Inventors: Kenneth A. Thurston, Salem, UT (US); Alan H. Glenn, Salem, UT (US)

(73) Assignee: Flowserve Management Company, Irving, TX (US)

(*) Notice: Subject to any disclaimer, the term of this patent is extended or adjusted under 35 U.S.C. 154(b) by 0 days.

(21) Appl. No.: 10/054,717

(22) Filed: Jan. 22, 2002

(65) Prior Publication Data
US 2003/0136454 A1 Jul. 24, 2003

(51) Int. Cl.[7] .................................................. F15D 1/00
(52) U.S. Cl. ........................ 138/42; 138/40; 251/127; 137/625.3
(58) Field of Search ................... 138/42, 40; 137/625.3, 137/625.33; 251/127

(56) References Cited

U.S. PATENT DOCUMENTS

| | | | |
|---|---|---|---|
| 3,513,864 A | 5/1970 | Self | 137/14 |
| 3,856,049 A | 12/1974 | Scull | 138/42 |
| 3,894,716 A | 7/1975 | Barb | 251/127 |
| 3,917,222 A | 11/1975 | Kay et al. | 251/127 |
| 4,018,245 A | 4/1977 | Baumann | 137/270 |
| 4,050,479 A | 9/1977 | Baumann | 138/42 |
| 4,060,099 A * | 11/1977 | Bates, Jr. | 137/625.3 |
| 4,068,683 A | 1/1978 | Self | 137/625.3 |
| RE29,714 E | 8/1978 | Hayner et al. | 138/42 |
| 4,105,048 A | 8/1978 | Self | 138/42 |
| 4,125,129 A | 11/1978 | Baumann | 137/625.3 |
| 4,127,146 A | 11/1978 | Self | 137/625.3 |
| 4,185,664 A | 1/1980 | Zabsky et al. | 138/40 |
| 4,267,045 A | 5/1981 | Hoof | 210/322 |
| 4,279,274 A | 7/1981 | Seger | 138/42 |
| RE31,105 E * | 12/1982 | Bates, Jr. | 137/625.3 |
| RE32,197 E | 7/1986 | Self | 251/127 |
| 5,390,896 A | 2/1995 | Smirl | 251/127 |
| 5,687,763 A | 11/1997 | Steinke | 137/625.33 |
| 5,732,738 A | 3/1998 | Graham | 137/625.33 |
| 5,769,122 A | 6/1998 | Baumann et al. | 137/625.33 |
| 5,772,178 A * | 6/1998 | Bey | 251/127 |
| 5,803,119 A | 9/1998 | Steinke | 137/625.37 |
| 5,819,803 A | 10/1998 | Lebo et al. | 138/42 |
| 5,941,281 A | 8/1999 | Baumann et al. | 137/625.33 |
| 6,026,859 A | 2/2000 | Wears et al. | 137/625.33 |
| 6,039,076 A | 3/2000 | Hemme et al. | 137/625.37 |
| 6,095,196 A | 8/2000 | McCarty et al. | 138/42 |
| RE36,984 E | 12/2000 | Steinke | 137/625.33 |
| 6,244,297 B1 | 6/2001 | Baumann | 137/625.3 |

\* cited by examiner

*Primary Examiner*—Patrick Brinson
(74) *Attorney, Agent, or Firm*—Killworth, Gottman, Hagan & Schaeff, L.L.P.

(57) ABSTRACT

The present invention provides a cost effective means by which pressure reduction in a fluid flow control device is optimized. The pressure reduction achieved according to the present invention also minimizes valve wear and presents new solutions in reducing, attenuating, eliminating, damping, redirecting, or otherwise defeating valve noise. In accordance with one embodiment of the present invention, a flow control device is provided including a valve trim assembly comprising a plurality of valve trim disks defining a plurality of flow paths along a fluid passage between a fluid inlet and a fluid outlet of the flow control device. Respective flow paths defined by the valve trim disks comprise an expansion/contraction mechanism, a velocity control mechanism, an acoustic chamber, and frequency shifting passages. The expansion/contraction mechanism has a cross section including rapid increases and decreases in cross-sectional flow area. The velocity control mechanism defines a cross-sectional flow profile defining a relatively low cross-sectional flow area proximate the fluid inlet and a relatively high cross-sectional flow area proximate the fluid outlet. The acoustic chamber is configured to defeat acoustic disturbances generated in the expansion/contraction mechanism and the velocity control mechanism. The frequency shifting passages are configured to direct fluid flow from the acoustic chamber to the fluid outlet and increase the sonic frequency of acoustic disturbances associated with the directed fluid.

45 Claims, 5 Drawing Sheets

STACKED DISK VALVE TRIM

BACKGROUND OF THE INVENTION

The present invention relates to fluid flow control devices and, more specifically, to an improved pressure reduction mechanism for a fluid valve.

The current patent literature includes a significant body of art relating to pressure reduction in fluid valves. Much of this literature is directed at optimizing pressure reduction while minimizing valve wear and valve noise. This drive to optimize pressure reduction while minimizing valve wear and noise continues today.

BRIEF SUMMARY OF THE INVENTION

The present invention provides a cost effective means by which pressure reduction in a fluid flow control device is optimized. The pressure reduction achieved according to the present invention also minimizes valve wear and presents new solutions in reducing, attenuating, eliminating, damping, redirecting, or otherwise defeating valve noise.

In accordance with one embodiment of the present invention, a flow control device is provided including a valve trim assembly comprising a plurality of valve trim disks defining a plurality of flow paths along a fluid passage between a fluid inlet and a fluid outlet of the flow control device. Respective flow paths defined by the valve trim disks comprise an expansion/contraction mechanism, a velocity control mechanism, an acoustic chamber, and frequency shifting passages. The expansion/contraction mechanism has a cross section including rapid increases and decreases in cross-sectional flow area. The velocity control mechanism defines a cross-sectional flow profile defining a relatively low cross-sectional flow area proximate the fluid inlet and a relatively high cross-sectional flow area proximate the fluid outlet. The acoustic chamber is configured to defeat acoustic disturbances generated in the expansion/contraction mechanism and the velocity control mechanism. The frequency shifting passages are configured to direct fluid flow from the acoustic chamber to the fluid outlet and increase the sonic frequency of acoustic disturbances associated with the directed fluid.

In accordance with another embodiment of the present invention, a flow control device is provided including a valve trim assembly comprising a plurality of valve trim disks defining a plurality of flow paths along a fluid passage between a fluid inlet and a fluid outlet of the flow control device. Respective flow paths defined by the valve trim disks comprise an expansion/contraction mechanism, a velocity control mechanism, and an acoustic chamber configured to defeat acoustic disturbances generated in the expansion/contraction mechanism and the velocity control mechanism.

In accordance with yet another embodiment of the present invention, a flow control device is provided including a valve trim assembly comprising a plurality of valve trim disks defining a plurality of flow paths along a fluid passage between a fluid inlet and a fluid outlet of the flow control device. Respective flow paths defined by the valve trim disks comprise an expansion/contraction mechanism that defines a plurality of V-shaped turns defining changes in flow direction of greater than 90 degrees, whereby a fluid passing through one of the turns undergoes rapid expansion going into a turn and rapid contraction coming out of a turn. The V-shaped turns are defined substantially entirely with a single disk of the plurality of disks, lying in a plane defined by the disk.

In accordance with yet another embodiment of the present invention, a flow control device is provided defining a plurality of flow paths along a fluid passage between a fluid inlet and a fluid outlet of the flow control device. The flow paths comprise an expansion/contraction mechanism, a velocity control mechanism, an acoustic chamber, and frequency shifting passages.

In accordance with yet another embodiment of the present invention, a valve trim disk is provided defining an inside diameter, an outside diameter, and a plurality of flow paths generally directed from the inside diameter to the outside diameter. The flow paths comprise an expansion/contraction mechanism defining a plurality of V-shaped turns of greater than 90 degrees, a velocity control mechanism, and an acoustic chamber.

In accordance with yet another embodiment of the present invention, a set of valve trim disks is provided defining respective, coaxial inside diameters, outside diameters, and a plurality of flow paths generally directed from the inside diameters to the outside diameters. The flow paths defined by the valve trim disks comprise an expansion/contraction mechanism, a velocity control mechanism, an acoustic chamber, and frequency shifting passages.

Accordingly, it is an object of the present invention to provide for optimized pressure reduction in a fluid flow control device while minimizing valve wear and presenting new solutions in reducing, attenuating, eliminating, damping, redirecting, or otherwise defeating valve noise. Other objects of the present invention will be apparent in light of the description of the invention embodied herein.

BRIEF DESCRIPTION OF THE SEVERAL VIEWS OF THE DRAWINGS

The following detailed description of the specific embodiments of the present invention can be best understood when read in conjunction with the following drawings, where like structure is indicated with like reference numerals and in which.

DETAILED DESCRIPTION

Figure 6:
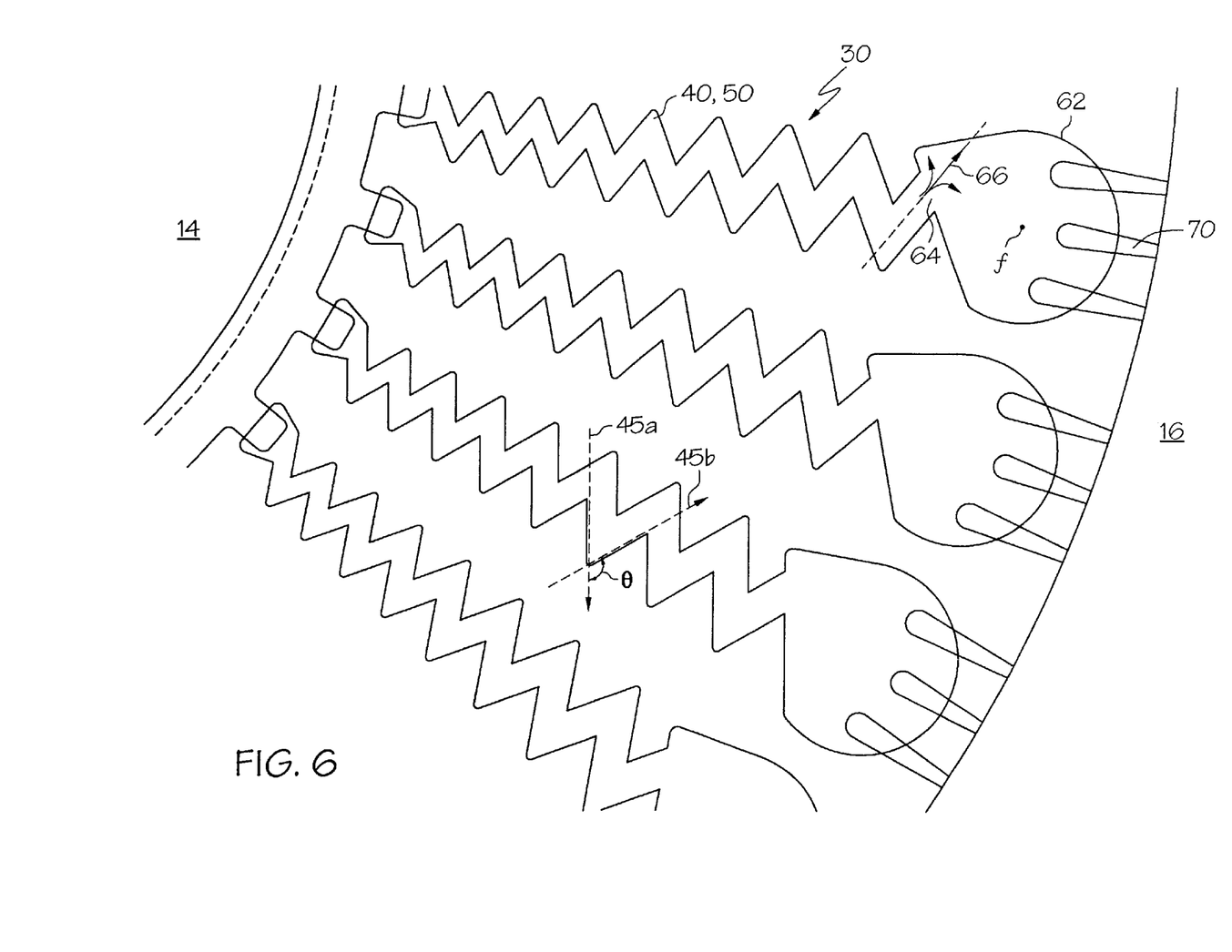
FIG. 6 illustrates a valve trim disk fluid flow path according to one embodiment of the present invention.
Figure 7:
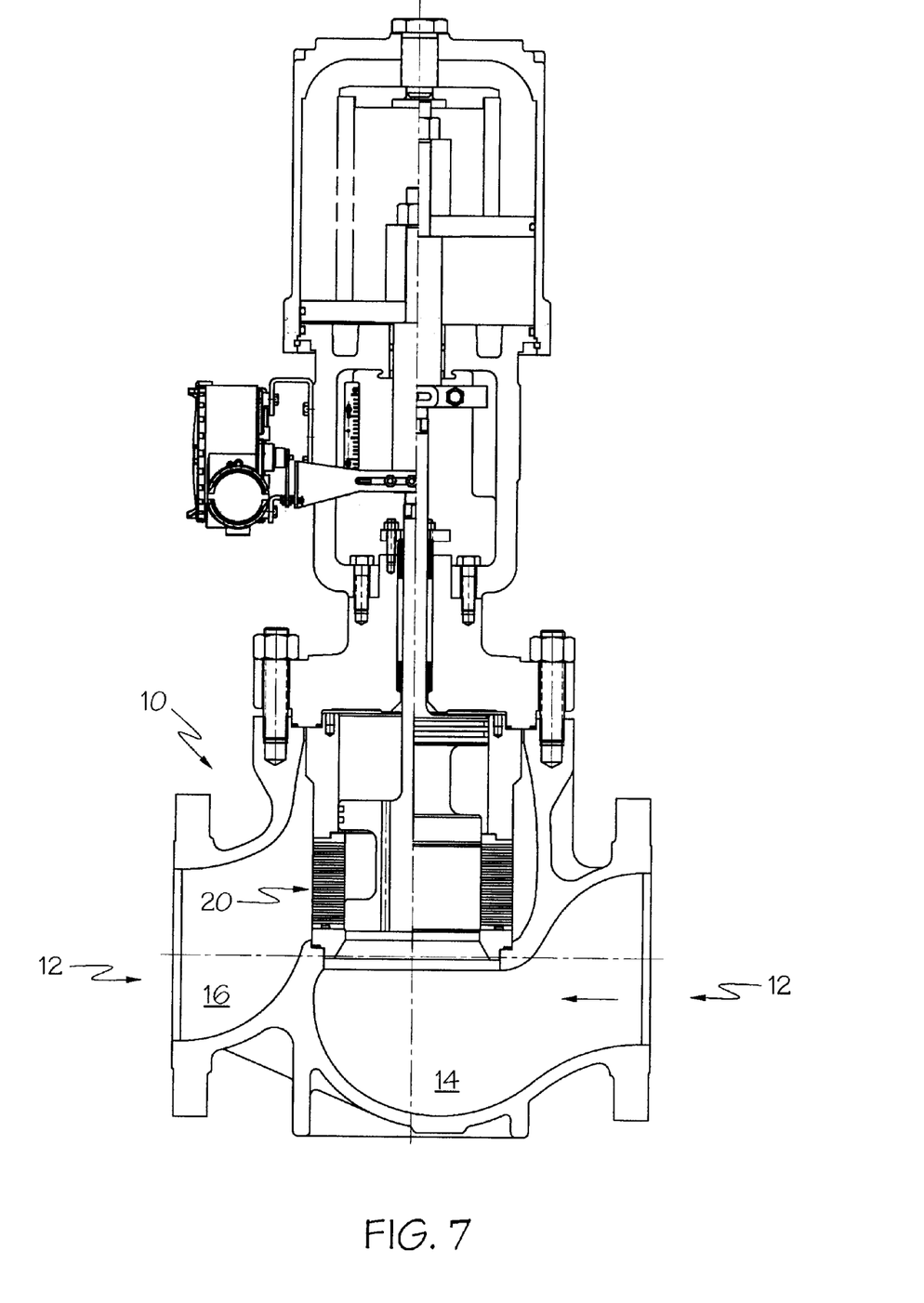
FIG. 7 illustrates flow control device including a valve trim disk assembly according to the present invention.

The present invention relates to fluid flow control devices and, more specifically, to an improved pressure reduction mechanism for a fluid valve. The general structure of a fluid flow control device or fluid valve 10 is illustrated in FIG. 7. Referring collectively to FIGS. 1–7, the flow control device 10 includes a valve trim assembly 20 comprising a plurality of valve trim disks 22A–22D defining a plurality of flow paths 30 along a fluid passage 12 between a fluid inlet 14 and a fluid outlet 16 of the flow control device 10. The respective flow paths 30 defined by the valve trim disks 22A–22D comprise an expansion/contraction mechanism 40, a velocity control mechanism 50, an acoustic chamber 60, and frequency shifting passages 70, each of which is described in detail herein. It is noted that the present invention enjoys applicability to a variety of fluid flow control devices and that the fluid valve 10 of FIG. 7 is presented for illustrative purposes only.

The valve trim disks 22A–22D typically include a flow passage disk 22A, an inlet/outlet disk 22B, and a separation disk 22C arranged adjacent to one another in a series or stack of a plurality of sets of adjacent disks. Respective top and bottom disks 22D define the top and bottom of a stack of disks. It is contemplated that the features of the flow passage disk 22A, the inlet/outlet disk 22B, and the separation disk 22C may be combined into fewer than three separate disks. It is noted however that the manufacturing costs associated with forming one or two disks incorporating all of the flow features of the disks 22A–C are often too high to justify such an approach.

For example, a typical stack of disks may begin with the bottom disk 22D, upon which may be stacked, in succession, a flow passage disk 22A, an inlet/outlet disk 22B, a separation disk 22C, another flow passage disk 22A, etc. The top of the stack is capped by a top disk 22D, the structure of which may be identical in cross section to the bottom disk 22D. The number and dimensions of the adjacent disks depends upon the preferred or required operating parameters of the fluid flow control device 10. In one embodiment of the present invention, the adjacent disks define an outside diameter of about 3" (7.5 cm), an inside diameter of about 1.5" (3.8 cm), and thicknesses of about 0.06" for flow passage disks 22A and inlet/outlet disks 22B, about 0.015" for the separation disk 22C, about 0.125" for the bottom disk 22D, and about 0.45" for the top disk 22D.

Figure 1:
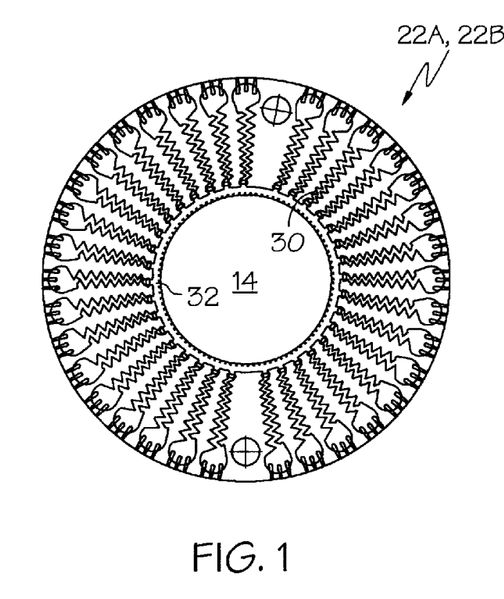
FIG. 1 illustrates a set of stacked valve trim disks according to one embodiment of the present invention.
Figure 2:
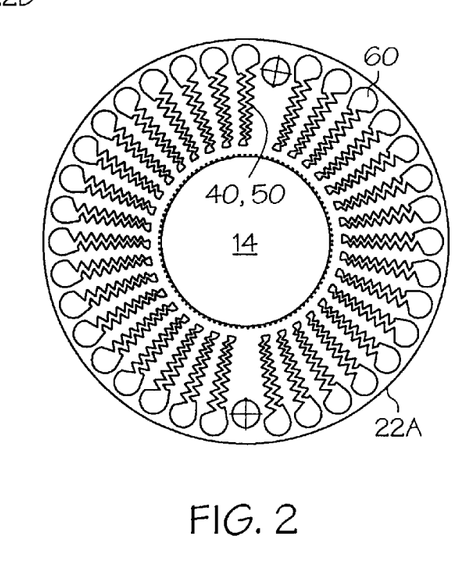
FIG. 2 illustrates a first valve trim disk of the set of valve trim disks illustrated in FIG. 1.

FIG. 1 illustrates the manner in which the flow passage disk 22A and the inlet/outlet disk 22B are stacked. As is illustrated, the central axes of the respective disks are aligned along a common central axis. In this manner, each of the sets of disks define a plurality of flow paths 30 extending in a radial direction from the central axis of the set of disks. In the illustrated embodiment, the inside diameter of the flow passage disk 22A is slightly smaller than that of the inlet/outlet disk 22B. In this manner, the flow paths 30 associated with each set of disks communicate with the fluid inlet 14 along a pressure equalizing annular ring 32.

The fluid inlet 14 is defined along the inner diameter of the disks and the fluid outlet 16 is defined along the outer diameter of the disks. Because of the stacked disk arrangement of the present invention, the fluid inlet 14 and the fluid outlet 16 corresponding to one of the flow paths 30 are offset from the flow path 30 along a direction perpendicular to a plane defined by the flow path 30. In this manner, fluid passing from the fluid inlet 14 to a flow path 30 encounters two significant changes in flow direction. Similarly, fluid passing from the flow path 30 to the fluid outlet 16 also encounters two significant changes in flow direction. Typically, the flow passage disk 22A and the inlet/outlet disk 22B are configured such that the changes in flow direction are about 90 degrees. Although not critical to the operation of the assembly, these significant changes in direction enhance the pressure reducing characteristics of the valve trim assembly 20.

The expansion/contraction mechanism 40 directs fluid flow into the acoustic chamber 60 and has a cross section that includes rapid increases and decreases in cross-sectional flow area. Specifically, as is illustrated in detail in FIG. 6, the expansion/contraction mechanism 40 defines a plurality of V-shaped turns defining changes in flow direction of greater than 90 degrees. As further illustrated in FIG. 6, a change in flow direction of greater than 90 degrees at one representational V-shaped turn is illustrated by the directional reference lines 45a, 45b and the angle θ, which is greater than 90 degrees. In this manner, fluid passing through the turns undergoes rapid expansion going into a turn and rapid contraction coming out of a turn. Although portions of the flow passage are bounded by the inlet/outlet disk 22B and the separation disk 22C, the turns themselves are defined substantially entirely by the flow passage disk 22A and lie in a plane defined by the disk 22A.

The expansion/contraction mechanism 40 as a whole defines an average cross sectional area that increases in the direction of the fluid outlet, i.e., the expansion/contraction mechanism 40 gets wider as it approaches the outside diameter of the disk. This expanding cross section defines the velocity control mechanism 50. Specifically, fluid velocity is reduced or held constant by defining a gradually increasing cross-sectional flow profile that has a relatively low cross-sectional flow area proximate the fluid inlet 14 and a relatively high cross-sectional flow area proximate the fluid outlet 16. In the illustrated embodiment, the velocity control mechanism and the expansion contraction mechanism are defined by a common portion of the flow path 30. However, it is noted that the two mechanisms 40, 50 may be defined by independent portions of the flow path 30.

The acoustic chamber 60, which is positioned downstream of the expansion/contraction mechanism 40 and the velocity control mechanism 50, is configured to reduce, attenuate, eliminate, redirect, damp, or otherwise defeat acoustic disturbances generated in the expansion/contraction mechanism 40 and the velocity control mechanism 50. The acoustic chamber 60 may be configured to incorporate many specific features that defeat acoustic disturbances. For example, the acoustic chamber 60 may be configured to function as a resonator tuned to one or more of the frequencies corresponding to the frequency of sound generated within the flow passage. Preferably, the tuned frequency or frequencies are about 180 degrees out of phase with sound entering the chamber 60.

It is also possible to defeat acoustic disturbances by minimizing creation of standing waves in the chamber 60. To this end, as is illustrated in FIG. 6, the chamber 60 is bound by non-parallel walls 62. In addition, the chamber inlet 64 is positioned along one of the chamber walls 62 such that fluid entering the chamber 60 through the chamber inlet 64 disperses in opposite directions along the chamber wall 62, as is indicated by the arrows in FIG. 6. The result is a diverging wavefront that is less subject to creation of standing waves.

The curved wall opposite the chamber inlet 64 is configured such that a focal point ƒ of the curved wall is offset from a path 66 along which fluid enters the acoustic chamber 60 through the chamber inlet 64. In this manner, redirection of fluid back towards the chamber inlet 64 is minimized.

Figure 3:
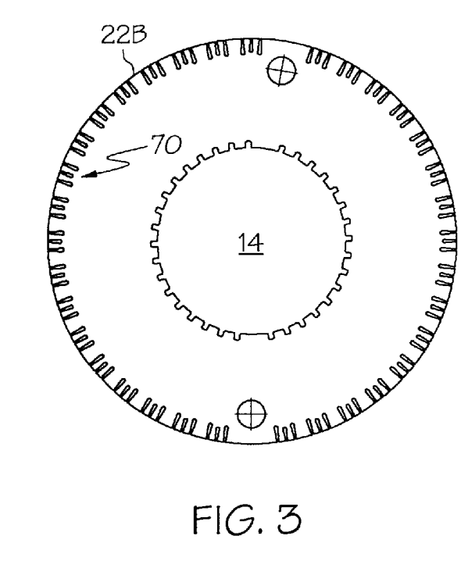
FIG. 3 illustrates a second valve trim disk of the set of valve trim disks illustrated in FIG. 1.
Figure 4:
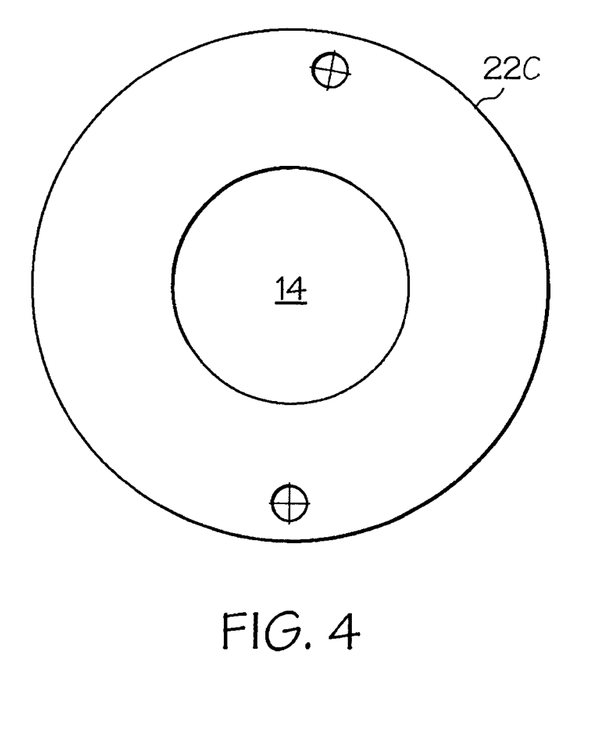
FIG. 4 illustrates a separation disk for a set of stacked valve trim disks according to the present invention.
Figure 5:
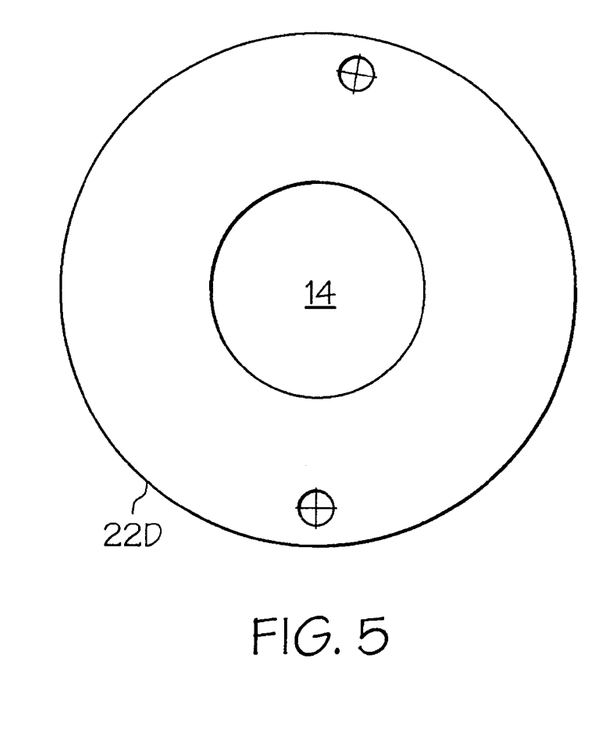
FIG. 5 illustrates a top/bottom disk for a stacked valve trim disk assembly according to the present invention.

The frequency shifting passages 70 are configured to direct fluid flow from the acoustic chamber 60 to the fluid outlet 16 and increase the sonic frequency of acoustic disturbances associated with the directed fluid. Specifically, the cross sectional area and length of the passages 70 are such that any acoustic disturbances transmitted through or created in the passages 70 have a significantly higher frequency than the acoustic disturbance associated with the remainder of the flow control device 10. As is illustrated in FIGS. 3 and 6, the frequency shifting passages 70 are in independent communication with the acoustic chamber 60 and extend from an outside diameter of the inlet/outlet valve trim disk 22B over a portion of the acoustic chamber 60. In the illustrated embodiment, a set of three frequency shifting passages 70 extend over each acoustic chamber 60, and do so to substantially equal extents.

As is further illustrated in FIG. 6, the frequency shifting passages 70 taper to a reduced cross section at the fluid outlet 16. In this manner, the passages 70 limit pressure recovery at the fluid outlet 16. The taper of the passages 70 also serves to isolate the outlet stream of each passage 70 from adjacent passage outlet streams, reducing interference between the outlet streams.

Figure 8A:
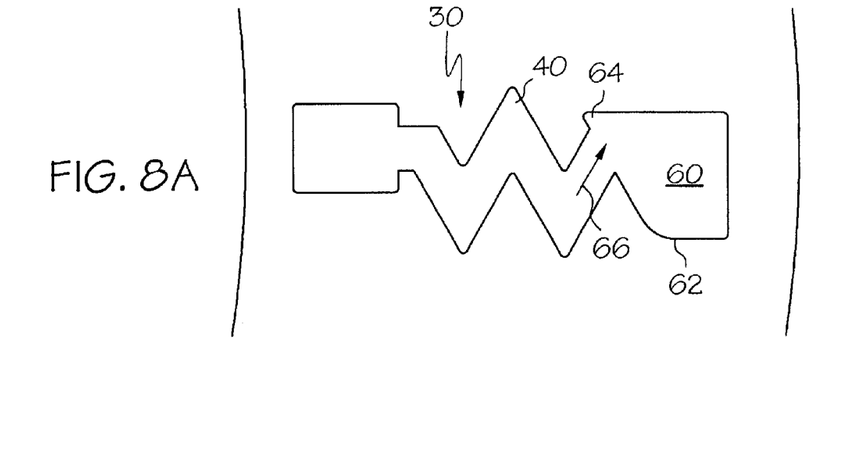
FIGS. 8A, 8B, and 8C illustrate alternative valve trim disk configurations according to the present invention.
Figure 8B:
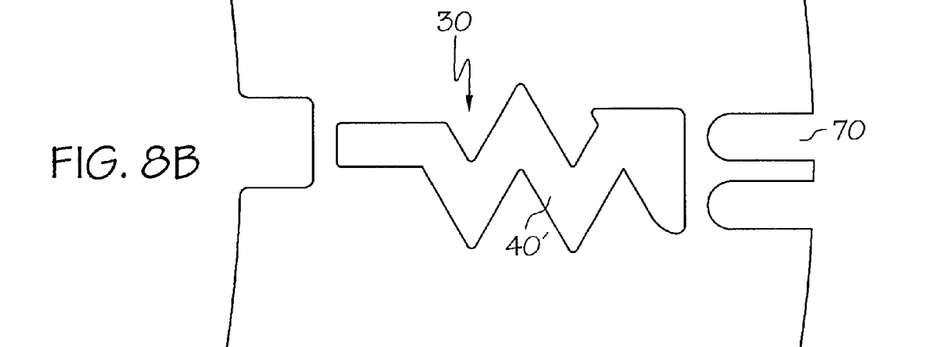
Figure 8C:
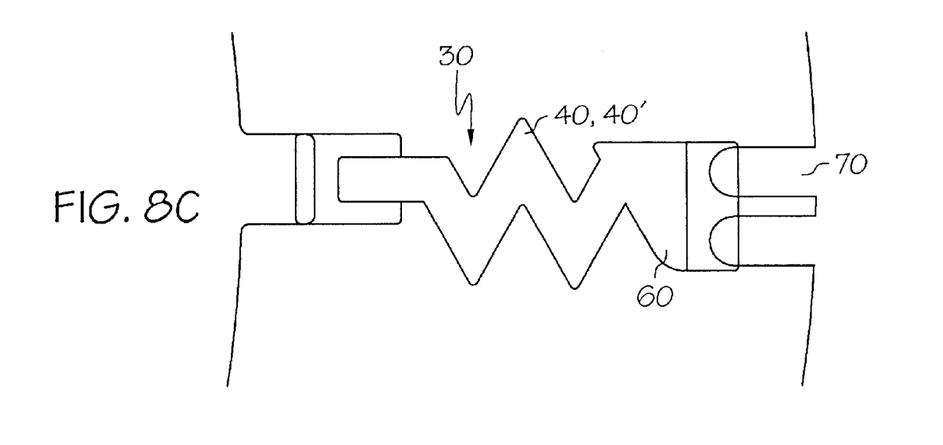

FIGS. 8A, 8B, and 8C illustrate alternative valve trim disk configurations according to the present invention. Specifically, FIG. 8A illustrates a flow passage disk 22A including a relatively short expansion/contraction mechanism 40 and a differently shaped acoustic chamber 60. The volume of the expansion/contraction mechanism 40 is increased by providing a coextensive expansion/contraction mechanism 40' in the inlet/outlet disk 22B (see FIG. 8B). A portion of the acoustic chamber 60 is also provided in the inlet/outlet disk 22B. FIG. 8C illustrates the flow passage disk 22A and the inlet/outlet disk 22B in a superposed state.

As is illustrated in FIGS. 8A, 8B, and 8C, in the acoustic chamber 60', the wall opposite the chamber inlet 64 is arranged to be angled away from a path 66 along which fluid enters the acoustic chamber 60. In this manner, redirection of entering fluid back towards the chamber inlet 64 is minimized.

It is noted that, the present invention is not limited to a three disk arrangement where an inlet/outlet disk, a flow passage disk, and a separation disk are provided. Nor is the present invention limited to an arrangement where a flow passage is provided in the inlet/outlet disk. Rather, the present invention contemplates a variety of disk arrangements, including but not limited to the three disk arrangements illustrated herein, arrangements where the inlet and the outlet are provided on separate disks, and arrangements where the flow paths, inlets, and outlets are provided on more or less than three disks.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. In addition, it is contemplated that a variety of passage and chamber designs may fall within the scope of the present invention without direct description of such designs herein.

What is claimed is:

1. A flow control device including a valve trim assembly comprising a plurality of valve trim disks defining a plurality of flow paths along a fluid passage between a fluid inlet and a fluid outlet of said flow control device, wherein respective flow paths defined by said valve trim disks comprise:

an expansion/contraction mechanism having a cross section including rapid increases and decreases in cross-sectional flow area;

a velocity control mechanism defining a cross-sectional flow profile defining a relatively low cross-sectional flow area proximate said fluid inlet and a relatively high cross-sectional flow area proximate said fluid outlet;

an acoustic chamber configured to defeat acoustic disturbances generated in said expansion/contraction mechanism and said velocity control mechanism; and frequency shifting passages configured to direct fluid flow from said acoustic chamber to said fluid outlet and increase the sonic frequency of acoustic disturbances associated with said directed fluid.

2. A flow control device as claimed in claim 1 wherein said plurality of valve trim disks includes a plurality of sets of two or more adjacent disks, each of said sets of disks defining a plurality of flow paths extending in a radial direction from a central axis of said set of disks.

3. A flow control device as claimed in claim 2 wherein said adjacent disks comprise an inlet/outlet disk, a flow passage disk, and a separation disk.

4. A flow control device as claimed in claim 1 wherein said fluid inlet and said fluid outlet are offset from said flow path along a direction perpendicular to a plane defined by said flow path such that fluid passing from said fluid inlet to said flow path encounters two significant changes in flow direction and fluid passing from said flow path to said fluid outlet encounters two significant changes in flow direction.

5. A flow control device as claimed in claim 4 wherein fluid passing from said fluid inlet to said flow path encounters two 90 degree changes in flow direction and fluid passing from said flow path to said fluid outlet encounters two 90 degree changes in flow direction.

6. A flow control device as claimed in claim 5 wherein said fluid inlet is defined along an inner diameter of one of said valve trim disks and said fluid outlet is defined along an outer diameter of one of said valve trim disks.

7. A flow control device as claimed in claim 1 wherein said plurality of flow paths communicate with said fluid inlet along a pressure equalizing annular ring.

8. A flow control device as claimed in claim 1 wherein said expansion/contraction mechanism defines a plurality of V-shaped turns defining changes in flow direction of greater than 90 degrees, whereby a fluid passing through one of said turns undergoes rapid expansion going into a turn and rapid contraction coming out of a turn.

9. A flow control device as claimed in claim 8 wherein said expansion/contraction mechanism defines a plurality of V-shaped turns defining changes in flow direction of greater than 90 degrees and less than 180 degrees.

10. A flow control device as claimed in claim 9 wherein said V-shaped turns are defined substantially entirely with a single disk of said plurality of disks, lying in a plane defined by said disk.

11. A flow control device as claimed in claim 1 wherein said expansion/contraction mechanism is defined substantially entirely with a single disk of said plurality of disks, lying in a plane defined by said disk.

12. A flow control device as claimed in claim 1 wherein said expansion/contraction mechanism defines an average cross sectional area that increases in the direction of said fluid outlet.

13. A flow control device as claimed in claim 1 wherein said expansion/contraction mechanism directs fluid flow into said acoustic chamber.

14. A flow control device as claimed in claim 1 wherein said velocity control mechanism and said expansion/contraction mechanism are defined by a common portion of said flow path.

15. A flow control device as claimed in claim 1 wherein said velocity control mechanism is defined by a portion of said flow passage having an average cross sectional area that increases in the direction of said fluid outlet.

16. A flow control device as claimed in claim 1 wherein said acoustic chamber is positioned downstream of said expansion/contraction mechanism and said velocity control mechanism.

17. A flow control device as claimed in claim 1 wherein said acoustic chamber is configured to function as a resonator tuned to at least one frequency corresponding to the frequency of sound generated within said flow passage.

18. A flow control device as claimed in claim 17 wherein said acoustic chamber is further configured such that said tuned frequency is out of phase with sound entering said acoustic chamber.

19. A flow control device as claimed in claim 18 wherein said acoustic chamber is further configured such that said tuned frequency is 180 degrees out of phase with sound entering said acoustic chamber.

20. A flow control device as claimed in claim 1 wherein said acoustic chamber is shaped to minimize creation of standing waves therein.

21. A flow control device as claimed in claim 1 wherein said acoustic chamber is bounded by non-parallel walls.

22. A flow control device as claimed in claim 1 wherein said acoustic chamber defines a chamber inlet defined along a chamber wall and wherein said chamber inlet is positioned along said chamber wall such that fluid entering said chamber through said chamber inlet disperses in opposite directions along said chamber wall.

23. A flow control device as claimed in claim 1 wherein said acoustic chamber defines a chamber inlet and a curved wall opposite said chamber inlet.

24. A flow control device as claimed in claim 23 wherein said curved wall is configured such that a focal point of said curved wall is offset from a path along which fluid enters said acoustic chamber through said chamber inlet.

25. A flow control device as claimed in claim 23 wherein said curved wall is configured to minimize redirection of entering fluid back towards said chamber inlet.

26. A flow control device as claimed in claim 1 wherein said acoustic chamber defines a chamber inlet and a wall opposite said chamber inlet, wherein said wall opposite said chamber inlet is arranged to be angled away from a path along which fluid enters said acoustic chamber through said chamber inlet so as to minimize redirection of entering fluid back towards said chamber inlet.

27. A flow control device as claimed in claim 1 wherein said frequency shifting passages extend from an outside diameter of a valve trim disk over a portion of said acoustic chamber.

28. A flow control device as claimed in claim 27 wherein each of said frequency shifting passages extend over said acoustic chamber to a substantially equal extent.

29. A flow control device as claimed in claim 1 wherein said frequency shifting passages define a cross sectional area that decreases from said acoustic chamber to said fluid outlet.

30. A flow control device as claimed in claim 1 wherein said frequency shifting passages are configured to isolate outlet streams of adjacent frequency shifting passages, reducing interference between adjacent outlet streams.

31. A flow control device as claimed in claim 1 wherein said plurality of adjacent disks include a plurality of flow passage disks and wherein each flow passage disk includes expansion/contraction mechanisms, velocity control mechanisms, acoustic chambers, and frequency shifting passages.

32. A flow control device as claimed in claim 31 wherein each flow passage disk includes cutout portions defining said expansion/contraction mechanisms, velocity control mechanisms, acoustic chambers, and frequency shifting passages, and wherein said cut-out portions extend entirely through the thickness of each flow passage disk.

33. A flow control device including a valve trim assembly comprising a plurality of valve trim disks defining a plurality of flow paths along a fluid passage between a fluid inlet and a fluid outlet of said flow control device, wherein respective flow paths defined by said valve trim disks comprise:

an expansion/contraction mechanism having a cross section including rapid increases and decreases in cross-sectional flow area;

a velocity control mechanism defining a cross-sectional flow profile defining a relatively low cross-sectional flow area proximate said fluid inlet and a relatively high cross-sectional flow area proximate said fluid outlet; and an acoustic chamber configured to defeat acoustic disturbances generated in said expansion/contraction mechanism and said velocity control mechanism.

34. A flow control device as claimed in claim 33 further comprising frequency shifting passages configured to direct fluid flow from said acoustic chamber to said fluid outlet and increase the sonic frequency of acoustic disturbances associated with said directed fluid.

35. A flow control device as claimed in claim 33 wherein said expansion/contraction mechanism defines a plurality of V-shaped turns defining changes in flow direction of greater than 90 degrees, whereby a fluid passing through one of said turns undergoes rapid expansion going into a turn and rapid contraction coming out of a turn.

36. A flow control device including a valve trim assembly comprising a plurality of valve trim disks defining a plurality of flow paths along a fluid passage between a fluid inlet and a fluid outlet of said flow control device, wherein:

respective flow paths defined by said valve trim disks comprise an expansion/contraction mechanism having a cross section including rapid increases and decreases in cross-sectional flow area;

said expansion/contraction mechanism defines a plurality of V-shaped turns defining changes in flow direction of greater than 90 degrees, whereby a fluid passing through one of said turns undergoes rapid expansion going into a turn and rapid contraction coming out of a turn; and said V-shaped turns are defined substantially entirely with a single disk of said plurality of disks, lying in a plane defined by said disk.

37. A flow control device as claimed in claim 36 wherein said expansion/contraction mechanism defines an average cross sectional area that increases in the direction of said fluid outlet to define a relatively low cross-sectional flow area proximate said fluid inlet and a relatively high cross-sectional flow area proximate said fluid outlet.

38. A flow control device as claimed in claim 36 wherein said flow paths defined by said valve trim disks further comprise a velocity control mechanism defining a cross-sectional flow profile defining a relatively low cross-sectional flow area proximate said fluid inlet and a relatively high cross-sectional flow area proximate said fluid outlet.

39. A flow control device as claimed in claim 36 wherein said flow paths defined by said valve trim disks further comprise an acoustic chamber configured to defeat acoustic disturbances generated in said expansion/contraction mechanism.

40. A flow control device as claimed in claim 36 wherein said flow paths defined by said valve trim disks further comprise frequency shifting passages configured to direct fluid flow to said fluid outlet and increase the sonic frequency of acoustic disturbances associated with said directed fluid.

41. A flow control device as claimed in claim 36 wherein said flow paths defined by said valve trim disks further comprise an acoustic chamber configured to defeat acoustic disturbances generated in said expansion/contraction mechanism and said velocity control mechanism and wherein said flow paths defined by said valve trim disks further comprise frequency shifting passages configured to direct fluid flow from said acoustic chamber to said fluid outlet and increase the sonic frequency of acoustic disturbances associated with said directed fluid.

42. A flow control device defining a plurality of flow paths along a fluid passage between a fluid inlet and a fluid outlet of said flow control device, wherein said flow paths comprise:

an expansion/contraction mechanism having a cross section including rapid increases and decreases in cross-sectional flow area, a velocity control mechanism defining a cross-sectional flow profile defining a relatively low cross-sectional flow area proximate said fluid inlet and a relatively high cross-sectional flow area proximate said fluid outlet, an acoustic chamber configured to defeat acoustic disturbances generated in said expansion/contraction mechanism and said velocity control mechanism, and frequency shifting passages configured to direct fluid flow from said acoustic chamber to said fluid outlet and increase the sonic frequency of acoustic disturbances associated with said directed fluid.

43. A valve trim disk defining an inside diameter, an outside diameter, and a plurality of flow paths generally directed from said inside diameter to said outside diameter, said flow paths comprising:

an expansion/contraction mechanism having a cross section including rapid increases and decreases in cross-sectional flow area, wherein said expansion/contraction mechanism defines a plurality of V-shaped turns defining changes in flow direction of greater than 90 degrees, whereby a fluid passing through one of said turns undergoes rapid expansion going into a turn and rapid contraction coming out of a turn;

a velocity control mechanism defining a cross-sectional flow profile defining a relatively low cross-sectional flow area proximate said inside diameter of said disk and a relatively high cross-sectional flow area proximate said outside diameter of said disk; and an acoustic chamber configured to defeat acoustic disturbances generated in said expansion/contraction mechanism and said velocity control mechanism.

44. A set of valve trim disks defining respective, coaxial inside diameters, outside diameters, and a plurality of flow paths generally directed from said inside diameters to said outside diameters, wherein respective flow paths defined by said valve trim disks comprise:

an expansion/contraction mechanism having a cross section including rapid increases and decreases in cross-sectional flow area;

a velocity control mechanism defining a cross-sectional flow profile defining a relatively low cross-sectional flow area proximate said inside diameters and a relatively high cross-sectional flow area proximate said outside diameters;

an acoustic chamber configured to defeat acoustic disturbances generated in said expansion/contraction mechanism and said velocity control mechanism; and frequency shifting passages configured to direct fluid flow from said acoustic chamber and increase the sonic frequency of acoustic disturbances associated with said directed fluid.

45. A flow control device as claimed in claim 33 further comprising:

frequency shifting passages configured to direct fluid flow from said acoustic chamber to said fluid outlet and increase the sonic frequency of acoustic disturbances associated with said directed fluid; and an expansion/contraction mechanism defining a plurality of V-shaped turns defining changes in flow direction of greater than 90 degrees, whereby a fluid passing through one of said turns undergoes rapid expansion going into a turn and rapid contraction coming out of a turn.

* * * * *